May 7, 1957    H. FERMAN    2,791,678
MOTOR VEHICLE GUIDE
Filed Jan. 7, 1952
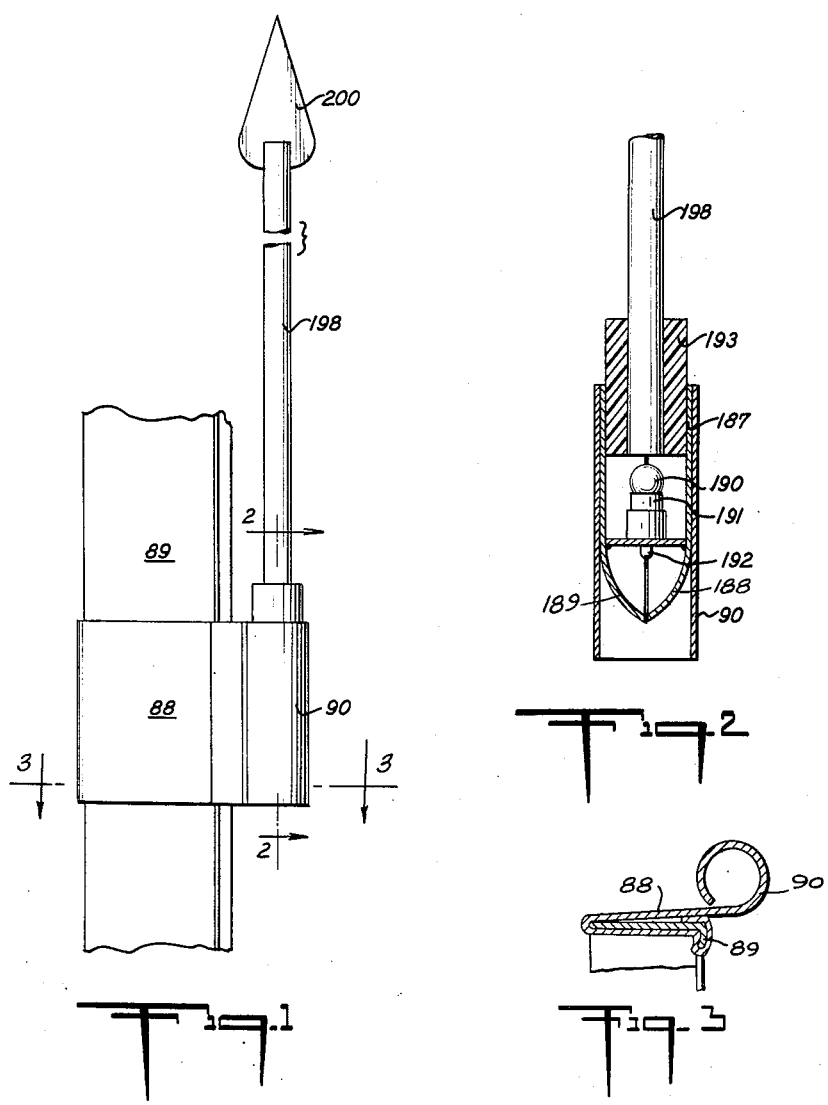
INVENTOR
HARRY FERMAN
BY *Fisher Christen*
ATTORNEY

United States Patent Office 2,791,678
Patented May 7, 1957

2,791,678
MOTOR VEHICLE GUIDE

Harry Ferman, Newark, N. J.

Application January 7, 1952, Serial No. 265,275

3 Claims. (Cl. 240—8.1)

This invention relates generally to motor vehicle indicators, and more specifically to indicators mounted on a ring portion of a motor vehicle headlamp, preferably on the headlamp rim, or on the rim portion of a sealed beam headlamp assembly and is a continuation-in-part of my pending application Serial No. 247,634 filed September 21, 1951.

An object of my invention is to provide an indicator which will enable the driver of a motor vehicle to ascertain the position of the front and sides of the motor vehicle, particularly the extreme front portion of the front fenders.

Another object of my invention is to provide an illuminated indicator which will be readily visible in darkness.

A further object of my invention is to provide a pair of illuminated motor vehicle indicators which will permit the driver of an approaching motor vehicle to ascertain the width of a vehicle equipped with such indicator means at the extreme outer front portions thereof.

Still another object of my invention is to provide an illuminated motor vehicle indicator which will enable vehicles to be suitably illuminated in emergency blackouts to permit travel and yet comply with emergency blackout regulations.

Yet another object is to provide a motor vhicle indicator construction which is adapted to be adjustably and securely mounted on various shapes and sizes of headlight rims.

A further object is to provide such an indicator which is of rugged and simple construction; which is inexpensive of manufacture, and which is adapted to be readily and securely attached to a headlight rim or flange adjacent thereto.

Further objects of my invention will be readily understood by reference to the following description and accompanying drawings.

I accomplish the object of my invention generally by providing a motor vehicle indicator comprising a support, fastening means secured to said support for attaching said support to a ring portion of a motor vehicle headlamp mounting, a vertically extending indicator rod mounted on said support and electrical illuminating means for illuminating the top portion of said indicator rod.

The invention generally comprises an indicator construction wherein said fastening means comprises a flexible strip one end thereof adapted to extend horizontally around and in contact with all the faces of an L-shaped headlamp rim and the other end thereof adapted to extend outwardly from said rim to provide support means for said indicator rod.

In the drawings:

Fig. 1 is a view in elevation showing a motor vehicle indicator support secured to the headlamp rim with an illuminated socket and a vertical indicator rod mounted therein;

Fig. 2 is a cross sectional view of Fig. 1 taken along lines 2—2;

Fig. 3 is a cross sectional view of Fig. 1 taken along lines 3—3.

In Fig. 1, the headlamp portion of a motor vehicle fender is generally indicated. An indicator or guide support shown generally at 88 is secured to the headlamp rim 89.

Figs. 2 and 3 show the details of my invention wherein a support member 88 is secured to the L-shaped rim 89 of a headlamp unit. The member 88 comprises a strip of flexible metal or the like which is shown bent to conform to the contour of L-shaped rim 89. Supporting member 88 preferably carries a socket member 90 which is adapted to receive an indicator rod 198 or support 187, although any suitable type of indicator support may be secured to member 88. The indicator support secured to member 88 may carry an electric lamp 190 to illuminate the indicator rod.

In Fig. 1, the tubular indicator support is indicated generally at 187, which is shown formed of two mating halves 188 and 189. An electric lamp 190 is positioned within the support 187 in a socket 191. Electrical connection to the vehicle's electrical system is made by wire 192. A sleeve member 193 which is made of Lucite or other light-transmitting material, is carried in the upper end of tubular support 187, and is adapted to receive a Lucite indicator rod 198, shown in place in Fig. 1.

The indicator shown in Figs. 1 and 2 may be used as an auxiliary parking light or as a vehicle turn signal when the indicator rod 198 is removed. The sleeve 193, being made of light-transmitting material, is particularly useful as a parking light for vehicles.

The motor vehicle indicator assembly of the pressent invention may be employed in a wide range of situations, including the protection of the vehicle fenders by enabling the driver to accurately determine the position of his vehicle. Other uses include the employment of a pair of such vehicle indicators suitably illuminated which will inform the driver of an approaching vehicle of the vehicle's width. It is further contemplated that the indicators may be useful in times of emergency necessitating blackouts. Thus, the indicators may be illuminated with, for example, blue lights, which are difficult to photograph from the air, but which are visible at great distances on the ground, and thus afford protection to vehicles driving during the blackout.

It is preferred that the indicator rods used in the present invention be removably secured in the indicator support, so that the indicator rod may be removed by the driver to prevent theft.

While the invention has been illustrated and described in its preferred forms, it will be apparent that various modifications and departures may be made by those skilled in the art, and it is intended that all such variations be included within the spirit and scope of the appended claims.

I claim:

1. A motor vehicle indicator comprising a tubular support member, a sleeve member positioned at the upper end of said support member, illuminating means carried by said support member, a vertically extending light-transmitting rod positioned in said sleeve member, said light-transmitting rod having its lower end positioned adjacent said illuminating means and fastening means for securing said tubular support member in vertical position adjacent a headlamp, said fastening means comprising a flexible strip, one end thereof adapted to extend horizontally around and in contact with the inner face of a motor vehicle headlamp rim and the other end extending outwardly from said rim and secured to said vertical tubular support.

2. A motor vehicle guide for attachment to a vehicle headlamp comprising a support, a vertically extending indicator rod mounted on said support adapted to extend a substantial distance above siad vehicle headlamp, fastening means secured to said support for attaching said support to an L-shaped rim portion of said motor vehicle headlamp comprising a flexible strip, one end thereof adapted to extend horizontaly around and in contact with all the faces of said L-shaped rim, and electrical illuminating means carried by said support for illuminating the top portion of said rod.

3. A motor vehicle guide for attachment to a vehicle headlamp comprising a support, a vertically extending indicator rod mounted on said support adapted to extend a substantial distance above said vehicle headlamp, fastening means secured to said support for attaching said support to an Lshaped rim portion of said motor vehicle headlamp comprising a flexible strip, one end thereof adapted to extend horizontaly around and in contact with all the faces of said L-shaped headlamp rim, and the other end of said flexible strip adapted to extend outwardly from said rim to provide support means for said indicator rod, and electrical illuminating means carried by support for illuminating the top portion of said rod.

References Cited in the file of this patent

UNITED STATES PATENTS

| | | |
|---|---|---|
| 1,603,252 | Appel | Oct. 12, 1926 |
| 1,613,805 | Reisinger | Jan. 11, 1927 |
| 1,771,817 | Ragsdale | July 29, 1930 |
| 2,636,109 | Cone | Apr. 21, 1953 |